June 30, 1925.
O. DREYER
1,544,137
DEVICE FOR PROTECTING ELECTRICAL CIRCUITS FROM OVERHEATING
Filed Jan. 21, 1925   2 Sheets-Sheet 1
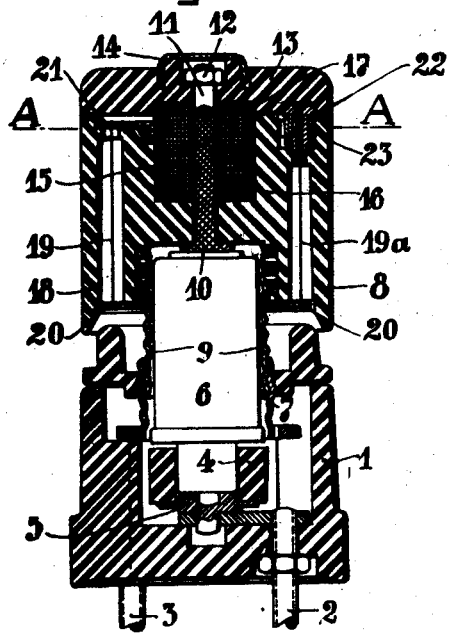
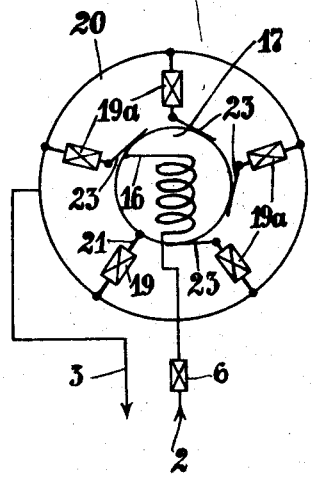
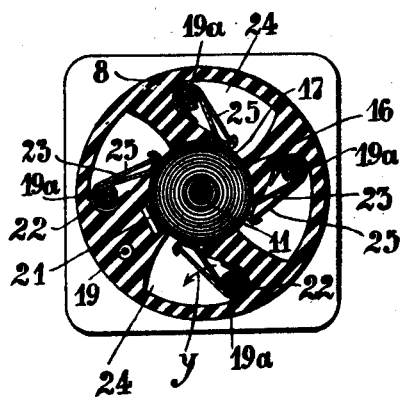
Otto Dreyer
INVENTOR
BY
ATTORNEY June 30, 1925.                                                                  1,544,137
O. DREYER
DEVICE FOR PROTECTING ELECTRICAL CIRCUITS FROM OVERHEATING
Filed Jan. 21, 1925                    2 Sheets-Sheet 2
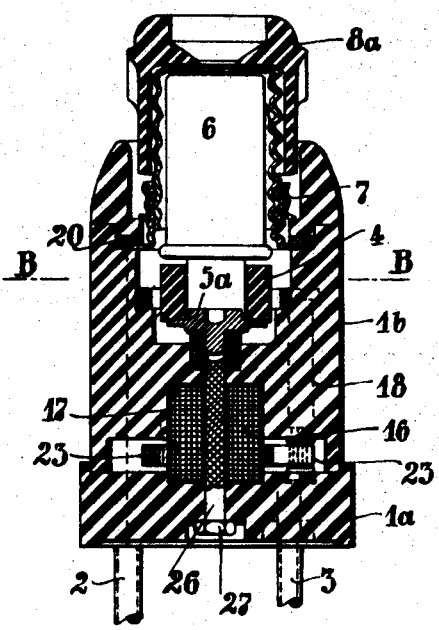
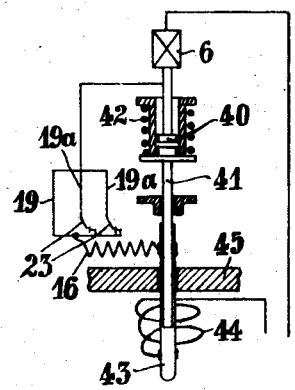
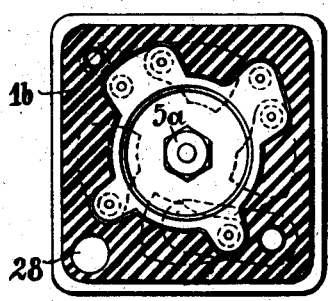
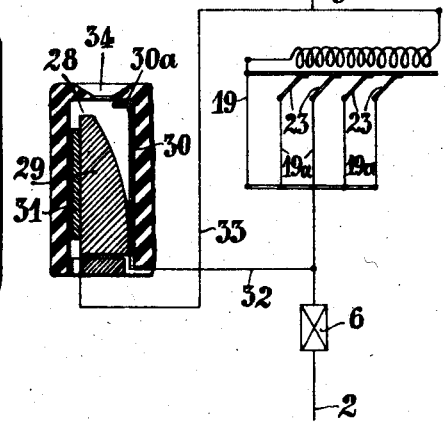
INVENTOR.
Otto Dreyer
BY
ATTORNEY.

Patented June 30, 1925.

1,544,137

UNITED STATES PATENT OFFICE.

OTTO DREYER, OF ESSEN-ON-THE-RUHR, GERMANY.

DEVICE FOR PROTECTING ELECTRICAL CIRCUITS FROM OVERHEATING.

Application filed January 21, 1925. Serial No. 3,731.

*To all whom it may concern:*

Be it known that I, OTTO DREYER, a citizen of the German Republic, and residing at Essen-on-the-Ruhr, Rhenish Prussia, Germany, have invented certain new and useful Improvements in Devices for Protecting Electrical Circuits from Overheating, for which I have filed applications for patent in Germany on March 3, 1923, and July 3, 1924, and of which the following is a specification.

Devices for protecting electrical circuits from overheating are already known in which the endangered circuit is finally disconnected by means of a fuse after the process of disconnection has been started by means of a temperature switch which is under the influence of a heating-coil.

The protecting device which forms the subject matter of the present invention differs from these known devices essentially in that it contains a plurality of fuses connected in parallel, each of which is only able to carry by itself a current of, at the most, the normal permanent working strength, while all the said fuses together can carry a current the strength of which is a multiple of the normal strength without breaking the circuit, and further that temperature switches are connected in series with a portion of these fuses and are influenced by a heating-coil in such a manner that they are released when the coil becomes heated above a predetermined temperature and thereby reduce the total number of the fuses to such an extent that the circuit is broken by the remaining fuses. By means of this arrangement it is possible to effect the disconnection of the circuit with certainty in practice, even when carrying very heavy currents, and, in particular, the danger that arcs may form across and remain on the temperature switches is eliminated.

The parallel-connected fuses and their heating-coil can be connected directly in the circuit to be protected or they may also be connected in shunt therewith, in which latter case a further temperature switch, which is influenced by a heating coil connected directly in the circuit to be protected or by the circuit itself, must be provided, which switch, when overheating occurs, passes the full operating current through the shunt circuit.

In order to effect the disconnection of the circuit on sudden heavy overloads, for example when a short-circuit occurs, an ordinary fuse may be connected in series with the new temperature protecting device. In order that, in the case of short-circuits or the like, only this ordinary fuse and not the parallel-connected fuses of the temperature protecting device shall come into operation, when the parallel-connected fuses are connected directly in the circuit to be protected the size of the latter must be such that all of them together are able to pass a current of greater strength than the short-circuit fuse.

The new temperature protecting device and the ordinary or short-circuit fuse can both be fitted in a single protecting element which is arranged on the switch-board or in a switch-box or the like. In this case the protecting device consisting of the parallel-connected fuses, the temperature switches and the heating coil may be located in the removable head of the element, which enables them to be changed or replaced in a particularly quick and simple manner.

Since, if all the fuses are arranged in a common element, the ordinary fuse-indicators can be made visible from the outside, at the most, for only a part of the fuses, according to the present invention, a new type of indicating device is employed which can be separate and at a distance from the fuses and may, for example, be arranged in a separate longitudinal passage or channel in the protecting element. This indicating device is based on the discovery made by the engineers Johnsen and Rahbeck that there is a considerable attraction between the two smooth surfaces, which are touching, of a conductor and a half-conductor or two half-conductors when a current flows from one surface to the other. Its construction is hereinafter described in detail.

Various constructional embodiments of the invention are illustrated by way of example in the accompanying drawing, in which Fig. 1 is a vertical, longitudinal section through a safety-element in accordance with the first example, Fig. 2 a cross-section on the line A—A of Fig. 1 and Fig. 3 the circuit diagram therefor.

Fig. 4 is a vertical longitudinal section through a safety-element in accordance with the second example, Fig. 5 a cross-section on the line B—B of Fig. 4.

Fig. 6 is the circuit diagram for the new indicating device, and

Fig. 7 is the circuit diagram for a safety-element according to the third example.

Referring in the first place to Figs. 1–3, 1 is the socket of a safety-element to be fixed to a switch-board or the like. The lower end of the socket 1 is provided with two plug contacts or terminals 2, 3, while there are arranged in its interior the lower contact 5, which is surrounded by a guide-ring 4, for an ordinary cartridge fuse which is to be inserted in the socket, for example a Diazed-fuse 6, as well as a screw-threaded ring 7 for the purpose of enabling the head 8 of the element to be screwed on. The lower contact 5 is connected as usual with one of the terminals, namely 2, while the screw-threaded ring is connected with the other terminal 3. The head of the safety element contains a screw-threaded tube 9 which can be screwed into the ring 7 and also an upper contact 10 for the fuse 6. This upper contact is formed by the head of a screw or bolt 11, the shank of which passes upwardly through a longitudinal hole in the head of the element to the outside, where it carries a nut 12 which can be screwed along it. This nut serves not only to fasten the upper contact 10, but at the same time to hold in place a separate removable cover 13, which is fitted to the head 8 of the element. The nut 12 lies in a recess in the cover 13 which recess is closed by a removable sheet metal cap 14.

The upper part of the head of the element contains a cylindrical recess 15 which is concentric with the shank of the screw 11 and usually closed by the cover 13. In this recess there is a heating-coil 16 which surrounds the shank 11 and of which the inner end is soldered to the shank of the screw and the outer end to a metal tube 17 which surrounds the coil. This heating-coil is so constructed that it heats-up as far as possible in exact accordance with the circuit to be protected, for example, the winding of a weight-lifting magnet or the like. The head 8 of the element is provided with a plurality (five in the embodiment illustrated) of longitudinal channels 18 which extend through it and are situated around the recess 15. These channels each contain a fuse wire 19, 19$^a$, etc. The lower ends of these five fuse wires are fastened to a metal ring 20, which is electrically connected with the screw-threaded tube 9. The upper end of one of these fuse wires, namely 19, is fastened to a metal strip 21, which in turn is connected both mechanically and electrically with the metal tube 17 surrounding the heating-coil 16. The upper ends of the remaining fuse wires 19$^a$ are, on the other hand, connected to metal bolts or pins 22, which are fixed in the upper ends of the channels 18 respectively and upon which small switch-arms 23 are revolubly mounted. The switch-arms 23, are located in recesses 24 in the upper end of the head 8 of the element, and are arranged in such a manner that they are able to turn about the pins 22 without their electrical connection with said pins being disturbed. The switch arms 23 are normally in the position illustrated in Fig. 2, in which they abut with their free ends against the metal tube 17 surrounding the heat-coil 16, and are soldered to this tube by means of an alloy which melts at a given, pre-determined temperature. The said arms are under the influence of flat springs 25 which tend to turn the arms 23 in the direction of the arrow $y$ (Fig. 2) but are normally prevented from doing so owing to the soldered joints.

Let it now be assumed, for example, that the circuit to be protected can take a permanent current of 12 amps. without excessive heating occurring. In this case the fuse wires 19, 19$^a$, all of which must possess the same characteristics as regards disconnecting the current, are of such size that each of them alone can permanently carry only a current of less than 12 amps. without disconnecting the circuit and, when the strength of the current is equal to 12 amps. or exceeds this, melts after a correspondingly longer or shorter time. The whole of the fuse wires 19, 19$^a$ therefore can together carry a current of 60 amps. before fusing occurs. The fuse 6 on the other hand, is of such a size that it melts at a current strength of 25 amps. as usual.

The above-described protecting device is connected in one of the current conducting leads to the electrical apparatus, machine or the like which is to be protected. The current flows from the terminal 2 through the lower contact 5, the fuse 6 and the contact 10 to the heating coil 16. After this the current divides and passes through the metal strip 21 and the switch-arms 23 to the five parallel-connected fuse wires 19, 19$^a$ and then flows through the metal ring 20, the screw-threaded tube 9 and the threaded ring 7 to the other terminal 3. When the normal operating current of 12 amps. is flowing as well as when overloads of short duration which occur when connecting-up motors which take a heavy rush of current on starting, such as three-phase, squirrel-cage motors, three-phase brake magnets and the like are taking place the protecting device is not influenced. If, however, the strength of the current increases above 25 amps. for other reasons, for example on account of a short circuit, the fuse 6 melts and thereby disconnects the endangered circuit without the temperature protecting device, which consists of the fuse wires 19, 19ᵃ and the heating-coil 16 being brought into action. This device, on the other hand, comes into operation if an inadmissible overheating of the current consuming apparatus or machine to be protected should occur on account of relatively small overloads of long duration or on account of heavy overloads of short duration when the machine to be protected is warm from working, which overloads have no effect on the fuse 6. If this occurs the heating-coil 16 also becomes heated at the same time above the highest temperature which is permissible in the circuit thereby causing the soldered joints of the switches 23 to melt and thus opening these switches. Since, owing to the unavoidable small differences in the amount of solder on each joint and in the strength of the individual springs 25, all the switches will never be opened simultaneously, the fuse wires 19ᵃ will be disconnected one after another, the period of time between the movements of the switches being greater or less according to the heaviness of the overload. Finally only a single fuse-wire, namely the wire 19, remains in circuit and this wire, owing to the fact that the strength of the current exceeds its conductive capacity, disconnects the endangered current consuming apparatus or machine. Of course, with heavier overloads disconnection may even take place when the last of the fuse wires 19ᵃ is still connected in the circuit, then both wires fuse. In any case the fuse 19 melts just at the moment when the switch of the last fuse 19ᵃ is opened. In spite of the fact that the whole of the operating current then flows through this swtich which is effecting the disconnection, the formation of an arc and the appearance of sparks at this switch is not to be feared because the corresponding fuse wire 19ᵃ, which is of the same thickness as the wire 19, also fuses at once and thereby breaks the circuit.

The constructional example according to Figs. 4 and 5 differs essentially from that of Figs. 1–3 only in that the heating coil 16 and the parallel-connected fuses 19, 19ᵃ part of which are provided with temperature switches 23, instead of being arranged in the head of the safety element, are arranged in the fixed part of the latter i. e. in the socket. In this case the socket of the element is divided and consists of a base-plate 1ᵃ which carries the connecting terminals 2, 3 and an intermediate member 1ᵇ fixed thereon the lower part of which contains a central recess for the reception of the heating-coil 16 and five longitudinal passages or channels 18 arranged around this recess for the fuse wires 19, 19ᵃ. The temperature switches 23 are in this case also located in the lower part of the intermediate member 1ᵇ.

The upper part of the intermediate member 1ᵇ contains the lower contact 5ᵃ together with the guide-ring 4 for a Diazed-cartridge 6 and the screw-threaded ring 7 for enabling the head 8ᵃ of the element to be screwed on. The head is in this case formed in the known and usual manner. The screw or bolt 26 which carries the lower contact 5ᵃ effects the electrical connection between the fuse 6 and the coil 16 in a similar manner to the screw 11 in the example illustrated in Figs. 1–3 and further it serves simultaneously for fastening the intermediate member 1ᵇ to the base 1ᵃ. In this case the nut 27, which screws on the bolt 26, is located on the underside of the base-plate 1ᵃ so that the intermediate member 1ᵇ can only be released if the complete element has been removed from the switch board. The method of operation is the same as with the form of construction illustrated in Figs. 1–3.

In both of the above described constructional embodiments the fuse wires, 19, 19ᵃ and the cartridge 6 may be provided with indicators of known type which show whether the fuses have come into operation and must be replaced. Of these indicators, however, only that belonging to fuse 6 is, in the constructional example according to Figs. 4 and 5, visible from the outside so that the element must be opened in order that the other indicators may become visible. In order to overcome this disadvantage the indicating device illustrated in Fig. 6 may advantageously be employed in combination with the new protecting device. This indicator may be at a distance and separate from the fuses and may be arranged in a side passage 28 in the safety element, which passage possesses an unobstructed observation aperture. (See the lower left-hand corner of Fig. 5 and Fig. 6).

The indicating device, which is illustrated by way of example, consists essentially of a wedge-shaped body 29 which is made of material which is only a partial conductor of electricity (a so called half-conductor), for example, slate, and a flexible body 30 of a material which is a good conductor, for example, a strip of metal. These two bodies are arranged one behind the other in the passage 28 of the safety element in such a manner that the metal strip 30 abuts for a porition of its length against the wedge-surface, which is advantageously arched, of the half-conductor 29, and is supported with its back against a piece of metal 31. The metal strip 30 and the piece of metal 31 are connected by means of the leads 32, 33 with that lead of the circuit to be protected which contains the protecting device in such a manner that the half-conductor and the metal strip are in shunt with that fuse, for example, fuse wires 19, 19ᵃ the condition of which is to be indicated. If these fuses melt owing to an overload of current a weaker current then flows through the shunt circuit. The passage of current across the surfaces of contact of the metal strip 30 and the half-conductor 29 results in the two surfaces being attracted towards one another. The metal strip 30 consequently bends towards the half-conductor 29 so that its upper, bent-over end 30ᵃ, which was previously not visible through the observation aperture 34 of the passage 28, now appears in the aperture. If the fuses 19, 19ᵃ are destroyed they are replaced by new ones and the metal strip owing to its elasticity returns to its original position. Since the current flowing through the shunt circuit is only very weak it is possible to carry out work on the apparatus, in spite of the current flowing through it, without any danger whatsoever. A particular advantage of the new indicating device is that the cartridge or the like which contain the fuse wires is enclosed on all sides, and may be made entirely resistant to pressure.

Obviously, many alterations in the embodiments illustrated as well as other forms of construction of the invention are possible. For example, the parallel-connected fuse-wires 19, 19ᵃ could also be of such a size that each of them is only able to carry a part of the permanent, permissible operating current. The number of the parallel-connected fuse-wires 19, 19ᵃ may differ from that in the examples illustrated and the fuse-wires, which are arranged directly in the longitudinal channels 18 in the head 8 of the element or in the intermediate member 1ᵇ could also be replaced by small tubular fuses which can be easily changed. The indicating device, instead of consisting of a half-conductor and a good conductor, may also consist of two half-conductors, one of which is flexible. The chief half-conductors to be considered are electrolytic conducting, solid bodies, such as a gelatine, hide, certain kinds of paper, salts and minerals, particularly slate, lithographic stone, agate, and the like.

Instead of being connected directly in the circuit to be protected, as in the embodiments illustrated in Figs. 1–5, the parallel-connected fuses 19, 19ᵃ together with their temperature switches 23 and the heating-coil 16 could also be connected in shunt with this circuit. An example of this is illustrated diagrammatically in Fig. 7. In this figure 19, 19ᵃ again represent the parallel-connected fuses, part of which is provided with temperature switches 23 which are influenced by a heating-coil 16. The fuses 19, 19ᵃ and the heating-coil 16 are in shunt with the circuit to be protected. They are normally short-circuited by a switch 40, 41 which is also constructed as a temperature switch. The movable part of this switch, which consists essentially of a rod 41, which is under the action of a spring 42 which tends to open it, is normally held in the closed position because the rod 41 is soldered in a tube 43 which is surrounded by a second heating coil 44 which is connected in the circuit to be protected. When working normally the electric current flows mainly through the temperature switch 40, 41 and the heating coil 44 while the shunt circuit, which contains the fuses 19, 19ᵃ and the heating-coil 16, only carries a small fraction of current. If an inadmissible heating-up of the circuit to be protected and therefore also of the heating-coil 44 takes place the switch 40, 41 is first set free, owing to the softening of the soldered joint in the tube 43, and is then opened by the spring 42. The full operating current now flows through the shunt circuit so that the heating-coil 16 also becomes heated. This results in the release of the temperature switches 23 whereby the total number of the fuses 19, 19ᵃ is gradually reduced so that the disconnection of a circuit is effected by the remaining fuses in a similar manner to that which has been fully described above with reference to the example illustrated in Figs. 1–3.

While the heating coil 44 must be of such dimensions that it heats-up correspondingly with the circuit or current consuming apparatus or machine to be protected, this is not necessary in the case of the coil 16. This coil can in the preceding case be so constructed that it heats up to such an extent when only the normal working current or even a current of less strength is passing that the temperature switch 23 is brought into action.

The temperature protecting device can again, as in the previously described examples, comprise a normal fuse or short-circuit safety device 6 which effects the disconnection when there is a sudden heavy overload without bringing the temperature protecting device into play. The parallel-connected fuses 19, 19ᵃ, the heating-coil 16, and the switch 40, 41 can be fitted in a safety element on the front of the switch-board, while the second heating coil 44 is located in a separate casing at the back of the switch-board. In this case tube 43 containing the soldered joint and the rod 41 pass through a hole in the switch-board into the interior of the coil 44. The constructional embodiment in accordance with Fig. 7 is specially suitable for being directly built into the current consuming device which is to be protected, for example, a motor. In this case the soldered joint of the temperature switch 40, 41 is influenced directly by the current consuming device in that the tube 43 projects into one of the coils or windings of the current consuming device. The coil 44 of Fig. 7 is thus replaced by a coil or winding of the motor or the like.

Claims:

1. A device for protecting electrical circuits from overheating, comprising a plurality of parallel-connected fuses each of which is only able to carry by itself a current of, at the most, the permanent, normal strength, while together the said fuses can carry a current the strength of which is a multiple of the normal strength without breaking the circuit, temperature switches connected in series with certain of said fuses, a heating-coil for releasing the switches when the said heating-coil becomes heated above a predetermined temperature, and means for opening the switches when released.

2. A device according to claim 1 characterized by the feature that the parallel-connected fuses and the heating coil which influences their temperature switches are connected in shunt with the circuit to be protected, a temperature switch in the circuit to be protected, and a heating coil connected in the circuit to be protected for releasing the last named switch.

3. A device for protecting electrical circuits from overheating, comprising a main circuit to be protected, a temperature switch in the circuit including separable contacts, spring means for urging the contacts apart, a fusible part normally holding the contacts closed, a heating coil for fusing the said fusible part, a shunt circuit around the switch contacts, a fuse in the shunt circuit, said shunt circuit includes a plurality of fuses connected in parallel, certain of said last fuses embodying a movable part normally held operative by a fusible element, and a heating coil common to said specified last fuses for fusing the respective elements thereof.

In testimony whereof I affix my signature.

OTTO DREYER.